Jan 6, 1931.  A. PIEPKORN  1,787,701
TRANSMISSION OF POWER
Filed July 22, 1929
Fig. 2,
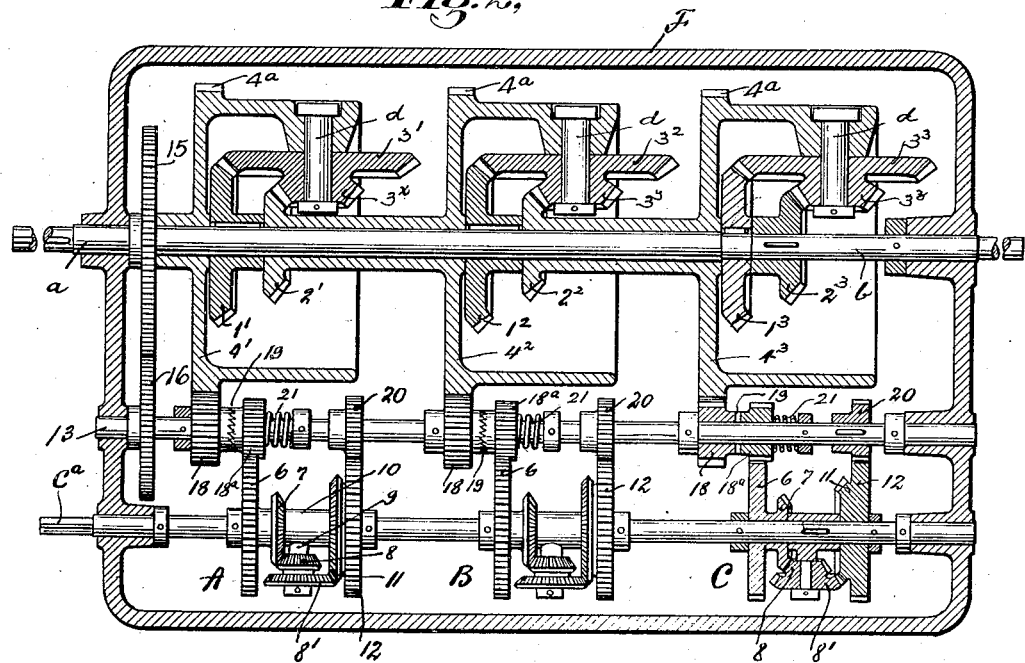
Fig. 1,
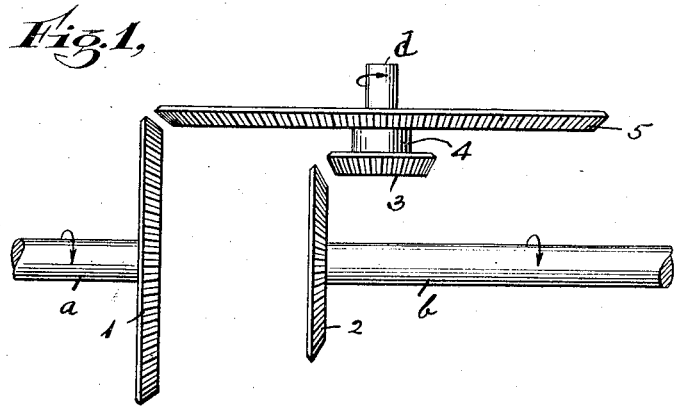
INVENTOR.
Arthur Piepkorn
BY
ATTORNEYS.

Patented Jan. 6, 1931

1,787,701

UNITED STATES PATENT OFFICE

ARTHUR PIEPKORN, OF BROOKLYN, NEW YORK

TRANSMISSION OF POWER

Application filed July 22, 1929. Serial No. 379,909.

This invention relates to power transmission and has for its object to provide a method of transmitting power from a shaft of given speed to a shaft whose speed may vary in a gradual continuous manner either to gradual and continuous acceleration or retardation between desired limits.

With ordinary gears the transmission of speed is limited to fixed ratios and therefore a continuous gradual change from one speed to another is impossible.

Another object of this invention is to provide means for carrying out my new method in an efficient manner and which means will be practical and comparatively simple.

To make my invention more clear the same is illustrated in the accompanying drawing which forms part of this specification and in which similar reference characters denote corresponding parts.

Fig. 1 is a sectional elevation of a unit of my new transmission mechanism, and

Fig. 2 is a sectional view of one embodiment of my complete transmission mechanism.

Referring first to Fig. 1 the differential gear constructed according to my invention comprises a bevel gear 1 keyed to a shaft $a$, gear 2 keyed to a shaft $b$ of variable speed, gear 3 keyed to a shaft $d$ revolubly borne in a frame 4 and meshing with gear 2. The frame 4 is mounted so as to be capable of revolving around shaft $a$ and is formed with the gear 5 meshing with gear 1.

Assuming that one of the three shafts $a$, $b$, and $c$, say $a$, is the input shaft of a given speed and one of the other shafts is a shaft driven from a variable speed motor. It is clear that any two of these three shafts can run at any desired speed and in any direction while the speed and direction of rotation of the third of the named shafts is determined.

Mathematical calculations show that when any one of the three shafts is driven to supply or take power, the supply or taking of power of the other two shafts is determined.

Now, the differential gear shown in Fig. 1 can be used for the transmission of power from one shaft to another, if the third shaft will be operated by a variable speed motor or controlled by a brake so as to vary its speed.

I have found, however, that the use of a single differential gear as shown in Fig. 1 would be practical only in cases where but a small range of variations is desired.

A larger range of variations would necessitate a more powerful variable speed motor. This would be of little advantage, since a powerful variable speed motor could accomplish the same results, as sought by me, without any additional device.

I find however, that by combining two or more differential gears of the type shown in Fig. 1, the number of units depending upon the range of variation of speed desired, I can effectively obtain the desired transmission of power, so as to considerably reduce the power that the variable speed motor would under ordinary circumstances have to supply or that for instance a brake used for controlling the speed would consume.

In the embodiment shown in Fig. 2 the differential gears or units of the construction substantially as per Fig. 1 are combined to form my new transmission mechanism. Let shaft $a$ denote the input shaft of any desired given speed and $b$ the output shaft of variable speed. Keyed or otherwise fixed on the input shaft $a$ and spaced relative to one another in longitudinal direction are three bevel gears $1'$ and $1^2$ and $1^3$. Meshing with these gears are bevel gears $3'$, $3^2$ and $3^3$, each revolubly borne on a shaft $d$, which shafts $d$ are revolubly borne in drums $4'$, $4^2$ and $4^3$, the latter being revolubly mounted on the input shaft $a$ as shown. The gears $3'$ and $3^2$ and $3^3$ are integrally formed with or have fixed to them gears $3^x$, $3^y$ and $3^z$ adapted to respectively mesh with gears $2'$, $2^2$ and $3^3$. According to the present embodiment two of the gears $2'$, $2^2$ are revolubly mounted on the input shaft $a$ and the third gear $2^3$ is keyed or otherwise fixed to the output shaft $b$. The gears $2'$, $2^2$ are integral with or otherwise operatively connected to the drums $4^2$, $4^3$ respectively.

The drums $4'$, $4^2$ and $4^3$ are adapted to be impelled from the variable speed shaft $c^a$ through a motor (not shown), in such a way that the drums $4'$, $4^2$ and $4^3$ may run with variable speed so that the speed of any of them may decrease to zero or even run in opposite direction.

To accomplish this I provide the following auxiliary mechanism:—

The shaft $c^a$ of the variable speed motor carries three sets or groups A, B and C of similar differential gears. Each of these sets is composed of a spur gear 6 revolubly mounted on the shaft $c^a$ and formed integrally with or having fixed thereto a bevel gear 7 concentric with the shaft $c^a$. This gear 7 meshes with a bevel gear 8 revolubly mounted on a shaft 9 projecting from a sleeve 10 keyed to the shaft $c^a$. The gear 8 is formed integrally with or has fixed to it another gear 8' which meshes with a bevel gear 11 integral with or fixed to a spur gear 12 revolubly mounted on shaft $c^a$. On a shaft 13 intermediate between shafts $a$ and $c^a$ and parallel thereto are rotatably mounted three sets of small spur gears 18, $18^a$, the gears 18 meshing with gears $4^a$ formed on the circumferences of said drums 4', $4^2$ and $4^3$ and the gears $18^a$ meshing with the spur gears 6 of the sets A, B, and C. Each set of gears 18, $18^a$ are in coupling connection with one another, as for instance by saw toothed members 19. Additionally there are mounted on the shaft 13 three sets of gears 20 keyed to or otherwise fixed on shaft 13 and which mesh with the spur gears 12 on the shaft $c^a$.

The shaft 13 may be driven from shaft $a$ through a set of gears 15, and 16 or through any other suitable means.

Now the operation is as follows:—

The shaft $a$ runs with a certain given speed. The variable speed shaft $c^a$ is driven with a speed sufficient to drive the output shaft $b$ with the desired speed. Part of power to be transmitted to shaft $b$ is distributed through gears 1', 3' into gear 2'. A comparatively small amount of power comes from the variable speed shaft $c^a$ and is transmitted through the coupling 19 to drum 4' and gear 3' into gear 2'. This latter gear being a part of drum $4^2$, transmits power over gear $3^2$ to gear $2^2$. Another amount of power coming from the input shaft is transmitted to gear $1^2$ over gear $3^2$ to gear $2^2$. This latter gear being part of the drum $4^3$ transmits power over gear $3^3$ to gear $2^3$. A still other amount of power coming from the input shaft $a$ is transmitted over gear $1^3$ and $3^3$ into gear $2^3$ and this gear $2^3$ being keyed to the output shaft $b$ transmits motion to the output shaft $b$.

Now assuming that the speed of the drum 4' reaches a certain minimum, the gear $18^a$ through which the drum 4' has been impelled cannot catch up with the gear 18, and at this point the intermediate drum has slowed down enough relative to its corresponding gear $18^a$ that the remaining units will be driven through said gear. The gear 18 and consequently the drum 4' owing to the coupling 19 will be allowed to slip or turn idle. As a result the output shaft $b$ will now be driven from the variable speed shaft $c^a$ through either of the two groups of stages B and C instead of the group A. Should the speed of the drum $4^2$ be sufficiently retarded then the drum $4^2$ too will be automatically cut out or rendered idle in the aforedescribed manner and the gear $2^2$ through its sleeve $4^b$ will retard the drum $4^3$ sufficiently so that the gear $18^a$ of the group or stage C will catch up with its gear 18 and the output shaft $b$ will be driven from shaft $d$ only through the third stage C.

Thus while the output shaft $b$ and the auxiliary shaft $c^a$ are gradually decreasing in speed from a certain maximum to a certain minimum the drums 4', $4^2$ and $4^3$ will be cut out automatically and successively through stages or groups A, B, C of the auxiliary mechanism. The gears of these groups must be so proportioned that one drum cuts out while the next drum starts to be driven by the auxiliary mechanism.

It will be obvious that the more stages or groups are used the greater the range of variation of the speed between a maximum and minimum of the output shaft and the less power will be consumed by the variable speed motor.

21 denotes springs which have the tendency to hold the toothed members 19 in coupling connection.

F denotes a suitable casing for the device.

It is understood that various modifications may be made in the construction of my device without departing from the spirit of my invention. I, therefore, do not wish to limit myself to the details of construction described and shown.—

What I claim is:—

1. A device for transmitting power at accelerable or retardable speeds from a driven shaft of given speed to an output shaft of variable speeds, comprising a plurality of sets of differential motion producing means between said two shafts, and an auxiliary mechanism including a variable speed impelled shaft and a corresponding number of sets of differential elements operated from said last named shaft and operatively connected to their respective differential motion producing means, and means whereby when the speed between any one set of differential motion producing means and the corresponding element of said auxiliary mechanism is at variance said differential motion producing means will be automatically cut out and power transmitted to the output shaft through the remaining sets of differential motion producing means.

2. A device as per claim 1 in which each set of differential motion producing means includes an element revolving around one of the first named shafts and is positively impelled from the neighboring differential motion producing means and indirectly through an automatically controlled means from the corresponding elements of the auxiliary mechanism.

3. A device as per claim 1, in which each of the sets of differential motion producing means includes a gear fixed to one of the main shafts and the last of the sets also has a gear fixed to the other of said shafts.

4. A device as per claim 1, in which each set of differential motion producing means includes an element revolving around one of the main shafts and is impelled from the shaft of said auxiliary mechanism through an automatically controlled coupling which is adapted to uncouple that one of said elements whose speed varies from that of the shaft of said auxiliary mechanism.

5. A device for transmitting power from an input shaft of given speed to an output shaft of variable speed, comprising sets of differential motion producing means, each including an element revolving around one of said shafts, elements of the different sets being adapted to be positively impelled from those of the preceding sets, and sets of variable speed impelled means operatively connected to said first named elements, and means whereby when the speed of either one of the former elements varies from that of the latter the former will be automatically cut out and the output shaft be controlled only from the remaining sets.

6. A device for transmitting power at accelerable and retardable speeds comprising primary differential motion producing means and secondary differential motion producing means, a plurality of intermediate elements adapted to run at different speeds and connected to one of said two means, means for automatically uncoupling said primary and secondary differential motion producing means through one of said elements and variable speed means for controlling the speed of said device.

7. A device for transmitting power at accelerable and retardable speeds from an input shaft of given speed to an output shaft of variable speed comprising sets of differential motion producing means mounted between said two shafts, and variable speed means adapted to control said sets of differential motion producing means comprising a variable speed shaft, a second set of differential means connected with the latter shaft and coupled to said first named means, and means to automatically uncouple coupled pairs of said two differential sets when the speeds thereof are at variance.

8. A device for transmitting power at accelerable and retardable speeds from an input shaft of given speed to an output shaft of variable speed comprising differential motion producing means mounted between said two shafts, and variable speed means adapted to control said differential motion producing means comprising a variable speed shaft, a second differential means connected with the latter shaft and means to automatically uncouple said two differential means when the speeds thereof are at variance.

In testimony whereof I affix my signature.

ARTHUR PIEPKORN.